US009543805B2

(12) United States Patent
Vollmer et al.

(10) Patent No.: US 9,543,805 B2
(45) Date of Patent: Jan. 10, 2017

(54) AXIAL BEARING DEVICE HAVING INCREASED IRON FILLING

(75) Inventors: Rolf Vollmer, Gersfeld (DE); Markus Oestreich, Schlitz (DE); Gunnar Schubert, Birkenwerder (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 416 days.

(21) Appl. No.: 14/009,951

(22) PCT Filed: Mar. 13, 2012

(86) PCT No.: PCT/EP2012/054385
§ 371 (c)(1),
(2), (4) Date: Oct. 4, 2013

(87) PCT Pub. No.: WO2012/136452
PCT Pub. Date: Oct. 11, 2012

(65) Prior Publication Data
US 2014/0028135 A1 Jan. 30, 2014

(30) Foreign Application Priority Data
Apr. 6, 2011 (EP) .................................. 11161286

(51) Int. Cl.
*H02K 7/09* (2006.01)
*F16C 32/04* (2006.01)
*H01F 3/02* (2006.01)

(52) U.S. Cl.
CPC ............. *H02K 7/09* (2013.01); *F16C 32/0461* (2013.01); *F16C 32/0476* (2013.01); *H01F 3/02* (2013.01)

(58) Field of Classification Search
CPC .............. H02K 7/08; H02K 7/09; H02K 1/16; H02K 1/165; F16C 32/04; H01F 3/02
USPC ......................................... 310/90.5, 216.007
See application file for complete search history.

(56) References Cited

U.S. PATENT DOCUMENTS

| 5,153,475 A * | 10/1992 | McSparran ......... F16C 32/0461 310/90.5 |
| 5,317,226 A * | 5/1994 | New ................... F16C 32/0461 310/90.5 |
| 5,939,811 A | 8/1999 | Enomoto et al. |
| 6,483,221 B1 | 11/2002 | Pawellek et al. |
| 6,628,031 B2 | 9/2003 | Vollmer |
| 6,768,238 B2 | 7/2004 | Knauff et al. |
| 6,812,612 B2 | 11/2004 | Schunk et al. |

(Continued)

FOREIGN PATENT DOCUMENTS

| DE | 691 03 756 T2 | 12/1994 |
| DE | 198 42 948 A1 | 3/2000 |

(Continued)

*Primary Examiner* — Michael Andrews
(74) *Attorney, Agent, or Firm* — Henry M. Feiereisen LLC.

(57) ABSTRACT

An axial bearing device includes an annular electrical sheet arrangement having individual sheets which protrude radially outward. In addition, an electrical coil is provided in the axial bearing device and is inserted into the electrical sheet arrangement to generate a magnetic field in the electrical sheet arrangement. The electric sheet arrangement includes at least two concentric electrical sheet rings. All adjacent electrical sheets of each electrical sheet ring substantially abut at the inner circumference of the respective electrical sheet ring.

14 Claims, 5 Drawing Sheets

(56) References Cited

U.S. PATENT DOCUMENTS

| | | |
|---|---|---|
| 6,858,965 B2 | 2/2005 | Mueller et al. |
| 6,885,187 B2 | 4/2005 | Duenisch et al. |
| 6,943,467 B2 | 9/2005 | Potoradi et al. |
| 7,141,905 B2 | 11/2006 | Vollmer |
| 7,285,883 B2 | 10/2007 | Bott et al. |
| 7,564,158 B2 | 7/2009 | Huth et al. |
| 7,705,507 B2 | 4/2010 | Vollmer |
| 7,709,984 B2 | 5/2010 | Braun et al. |
| 7,732,967 B2 | 6/2010 | Schunk et al. |
| 7,745,965 B2 | 6/2010 | Oestreich |
| 7,755,315 B2 | 7/2010 | Bott et al. |
| 7,777,373 B2 | 8/2010 | Bott et al. |
| 7,859,160 B2 | 12/2010 | Vollmer |
| 7,893,573 B2 | 2/2011 | Markert |
| 7,915,777 B2 | 3/2011 | Vollmer |
| 7,977,826 B2 | 7/2011 | Vollmer et al. |
| 8,026,640 B2 | 9/2011 | Bott et al. |
| 8,035,371 B2 | 10/2011 | Budde et al. |
| 8,063,517 B2 | 11/2011 | Bott et al. |
| 8,063,525 B2 | 11/2011 | Petereit et al. |
| 8,115,360 B2 | 2/2012 | Vollmer |
| 8,134,273 B2 | 3/2012 | Vollmer et al. |
| 8,227,951 B2 | 7/2012 | Grossmann et al. |
| 8,283,815 B2 | 10/2012 | Vollmer |
| 8,378,541 B2 | 2/2013 | Vollmer |
| 2003/0011267 A1 | 1/2003 | Vollmer |
| 2003/0094940 A1 | 5/2003 | Duenisch et al. |
| 2003/0173853 A1 | 9/2003 | Knauff et al. |
| 2004/0075359 A1 | 4/2004 | Muller et al. |
| 2004/0084989 A1 | 5/2004 | Schunk et al. |
| 2004/0155539 A1 | 8/2004 | Potoradi et al. |
| 2004/0261553 A1 | 12/2004 | Bott et al. |
| 2005/0231060 A1 | 10/2005 | Vollmer |
| 2006/0219880 A1 | 10/2006 | Braun et al. |
| 2007/0035193 A1 | 2/2007 | Huth et al. |
| 2007/0040466 A1 | 2/2007 | Vollmer |
| 2007/0114861 A1 | 5/2007 | Bott et al. |
| 2007/0257566 A1 | 11/2007 | Vollmer |
| 2007/0257575 A1 | 11/2007 | Vollmer |
| 2008/0073985 A1 | 3/2008 | Bott et al. |
| 2008/0164777 A1 | 7/2008 | Braun et al. |
| 2008/0169718 A1 | 7/2008 | Bott et al. |
| 2008/0185931 A1 | 8/2008 | Platen et al. |
| 2008/0197741 A1 | 8/2008 | Schunk et al. |
| 2008/0197742 A1 | 8/2008 | Vollmer |
| 2008/0289440 A1 | 11/2008 | Denk et al. |
| 2008/0303359 A1 | 12/2008 | Oestreich |
| 2008/0315704 A1 | 12/2008 | Vollmer |
| 2009/0009114 A1 | 1/2009 | Schunk et al. |
| 2009/0015080 A1 | 1/2009 | Vollmer et al. |
| 2009/0039713 A1 | 2/2009 | Bott et al. |
| 2009/0072634 A1 | 3/2009 | Vollmer |
| 2009/0091203 A1 | 4/2009 | Petereit et al. |
| 2009/0152959 A1 | 6/2009 | Vollmer |
| 2009/0152976 A1 | 6/2009 | Bott et al. |
| 2009/0160283 A1 | 6/2009 | Bott et al. |
| 2009/0184602 A1 | 7/2009 | Braun et al. |
| 2009/0206686 A1 | 8/2009 | Vollmer |
| 2009/0212644 A1 | 8/2009 | Bott et al. |
| 2009/0218904 A1 | 9/2009 | Vollmer |
| 2009/0230789 A1 | 9/2009 | Markert |
| 2009/0251013 A1 | 10/2009 | Vollmer et al. |
| 2009/0295236 A1 | 12/2009 | Bott et al. |
| 2009/0295251 A1 | 12/2009 | Vollmer et al. |
| 2009/0302832 A1 | 12/2009 | Budde et al. |
| 2009/0315424 A1 | 12/2009 | Vollmer |
| 2009/0322174 A1 | 12/2009 | Grossmann et al. |
| 2010/0000830 A1 | 1/2010 | Budde et al. |
| 2010/0013332 A1 | 1/2010 | Vollmer |
| 2010/0013333 A1 | 1/2010 | Vollmer |
| 2010/0013341 A1 | 1/2010 | Vollmer |
| 2010/0052466 A1 | 3/2010 | Vollmer et al. |
| 2010/0133940 A1 | 6/2010 | Grossmann et al. |
| 2010/0264770 A1 | 10/2010 | Braun et al. |
| 2011/0006617 A1 | 1/2011 | Budde et al. |
| 2012/0025654 A1 | 2/2012 | Bach et al. |
| 2012/0038228 A1 | 2/2012 | Vollmer |
| 2012/0181887 A1 | 7/2012 | Schubert et al. |

FOREIGN PATENT DOCUMENTS

| | | |
|---|---|---|
| EP | 0 795 881 A1 | 9/1997 |
| SU | 1299522 A3 | 3/1987 |

* cited by examiner

AXIAL BEARING DEVICE HAVING INCREASED IRON FILLING

CROSS-REFERENCES TO RELATED APPLICATIONS

This application is the U.S. National Stage of International Application No. PCT/EP2012/054385, filed Mar. 13, 2012, which designated the United States and has been published as International Publication No. WO 2012/136452 and which claims the priority of European Patent Application, Serial No. 11161286.7, filed Apr. 6, 2012, pursuant to 35 U.S.C. 119(a)-(d).

BACKGROUND OF THE INVENTION

The present invention relates to an axial bearing device having an annular electrical sheet arrangement in which the individual sheets protrude radially outward, and an electrical coil which is inserted into the electrical sheet arrangement in order to generate a magnetic field in the electrical sheet arrangement.

Active, magnetic axial bearings are used in order to set defined spacings between two objects in contactless fashion. The basic construction of such an axial bearing can be seen in FIG. 1. In the example a shaft 1 is mounted in axial fashion. A steel disk 2 is attached concentrically on the shaft 1. In addition to the steel disk 2 the axial bearing arrangement here has two annular electromagnets 3, 4 (here also referred to as axial bearing devices) which are arranged on both sides of the steel disk 2 coaxially therewith and with the shaft 1. While the electromagnets 3 and 4 are static and are attached for example on the housing of an electrical machine, the shaft including the steel disk 2 rotates in the interior of the two electromagnets 3, 4.

The electromagnets 3, 4 exert forces on soft magnetic materials such as the steel disk 2. When the electromagnets 3, 4 are suitably controlled, the steel disk 2 can be held in contactless fashion at a defined axial position between the electromagnets 3 and 4.

The electromagnets 3, 4 are as a rule constructed using torroidal cores which are arranged in a groove in an iron support. The iron support is usually of solid construction. In solidly constructed supports field changes result in eddy currents which in turn produce opposing fields. The controllability of the magnetic bearings is thereby degraded.

Eddy currents are reduced in a known manner through lamination of the support iron. The lamination of axial bearing supports is known from the publication DE 691 03 756 T2 where the stator and rotor components of a magnetic thrust bearing are described with each having a laminated design. The lamination sheets are curved such that their tips lie in a common cylindrical plane. In addition, side edges abutting one another of the lamination sheets likewise lie in common planes which are arranged perpendicular to the axis of rotation.

SUMMARY OF THE INVENTION

An electromagnetic device for a fuel injection pump is known from EP 0 795 881 A1. The stator of the electromagnetic device comprises a plurality of electrical sheets which are arranged in spiral form around the center axis of the stator.

The object of the present invention consists in improving the degree of efficiency of the magnetic axial bearing device.

This object is achieved according to the invention by a magnetic axial bearing device having an annular electrical sheet arrangement wherein the individual sheets protrude radially outward and adjacent sheets form a gap in the circumferential direction, and an electrical coil which is inserted into the electrical sheet arrangement in order to produce a magnetic field in the electrical sheet arrangement, wherein the electrical sheet arrangement has at least two concentric electrical sheet rings and essentially all the adjacent sheets of each electrical sheet ring meet at the inner circumference of the respective electrical sheet ring.

An annular electrical sheet arrangement of a known construction type has sheets which extend continuously from the inner circumference to the outer circumference of the electrical sheet arrangement. Since the electrical sheets have the same width throughout and abut one another at the inner circumference, correspondingly large gaps between adjacent sheets result at the outer circumference. This means that the iron filling of such a type of annular electrical sheet arrangement is not very high. In an advantageous manner therefore according to the present invention the electrical sheet arrangement is divided into at least two concentric electrical sheet rings. With regard to each electrical sheet ring the electrical sheets extend in each case from the inner circumference to the outer circumference. Since even in the case of the outermost of the at least two electrical sheet rings the electrical sheets now abut one another at the inner circumference thereof a higher iron filling can be achieved because in the case of the conventional electrical sheet arrangement the individual sheets are distinctly spaced apart at the radial height of the inner circumference of the outermost electrical sheet ring of the arrangement according to the invention.

By preference the electrical sheet arrangement has three concentric electrical sheet rings, in which case the middle one of the electrical sheet rings forms a depression into which the electrical coil is inserted. In this situation it is particularly advantageous if the middle electrical sheet ring has the same radial width as the inserted electrical coil. The axial bearing device is thereby designed to be simple to manufacture.

In addition, an opening can be arranged in the axial direction in the middle electrical sheet ring for feeding through cables for the electrical coil. This has the advantage that the connecting lines for the electrical coil can take the shortest possible route to the outside, in which case the magnetic circuit is only minimally disrupted.

In a preferred embodiment the electrical sheet arrangement is accommodated in an annular pot. The pot stabilizes the electrical sheet arrangement in both radial directions and in an axial direction.

The electrical sheet arrangement can be retained in the pot by means of one or more retaining rings. By this means the electrical sheet arrangement is also fixed with respect to the open side of the pot.

If such a retaining ring is designed to have a T-shaped cross-section, it can retain the innermost and also the outermost electrical sheet ring in the axial direction in form-locked fashion in the pot. Two electrical sheet rings are thereby fixed axially by means of a single retaining ring.

Furthermore, the middle electrical sheet ring can be retained in form-locked fashion in the pot by means of the innermost and outermost electrical sheet rings. The entire electrical sheet arrangement, which here consists of three electrical sheet rings, can thereby be fixed in the pot by means of a single retaining ring which, as mentioned above, is for example designed to have a T-shape.

According to a further preferred embodiment the interstices between the sheets of the electrical sheet arrangement are filled with a resin. This stabilizes the individual sheets with respect to one another and thereby the entire electrical sheet arrangement and at the same time ensures the necessary electrical insulation.

Particularly advantageously, an electrical machine can be equipped with such an axial bearing device. The magnetic axial bearing ensures minimal friction losses.

BRIEF DESCRIPTION OF THE DRAWING

The present invention will now be described in detail with reference to the attached drawings. In the drawings.

DETAILED DESCRIPTION OF PREFERRED EMBODIMENTS

The exemplary embodiments described in detail in the following constitute preferred embodiments of the present invention.

Figure 1:
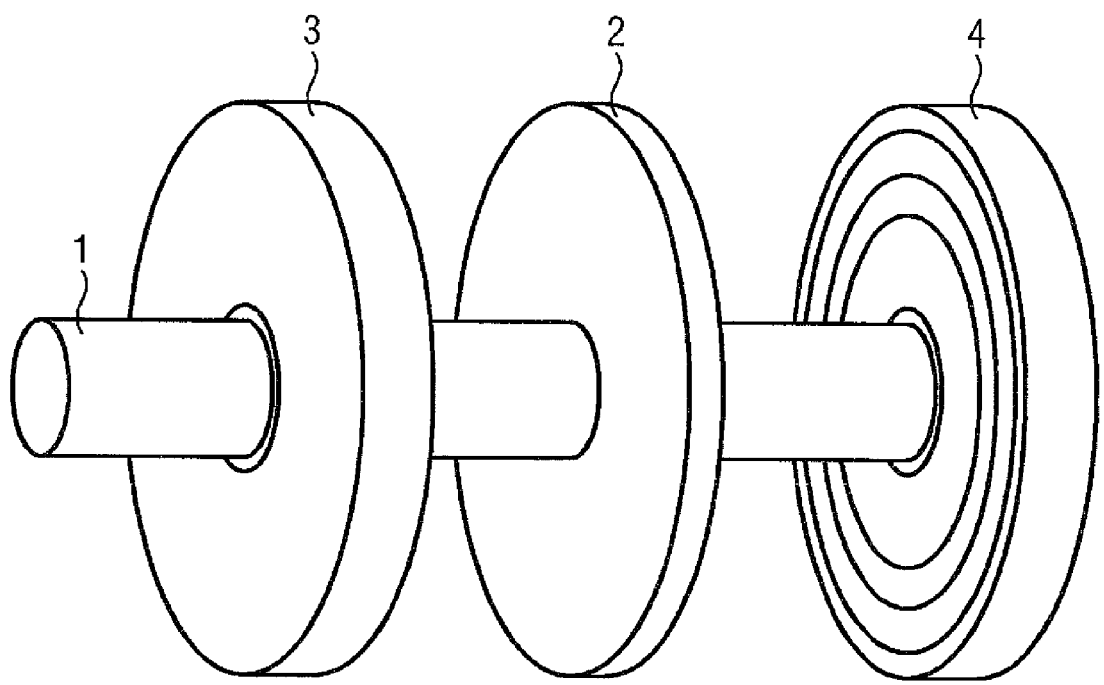
FIG. 1 shows an axial bearing according to the prior art.

For example, a generator or another electrical machine has an axial bearing, as is illustrated in principle in FIG. 1. The electromagnets 3 and 4 of the axial bearing, in other words of the axial bearing arrangement, have a construction according to the invention, as is demonstrated in detail in the following. The construction is simple and results in a high iron filling and a robust combination.

Figure 2:
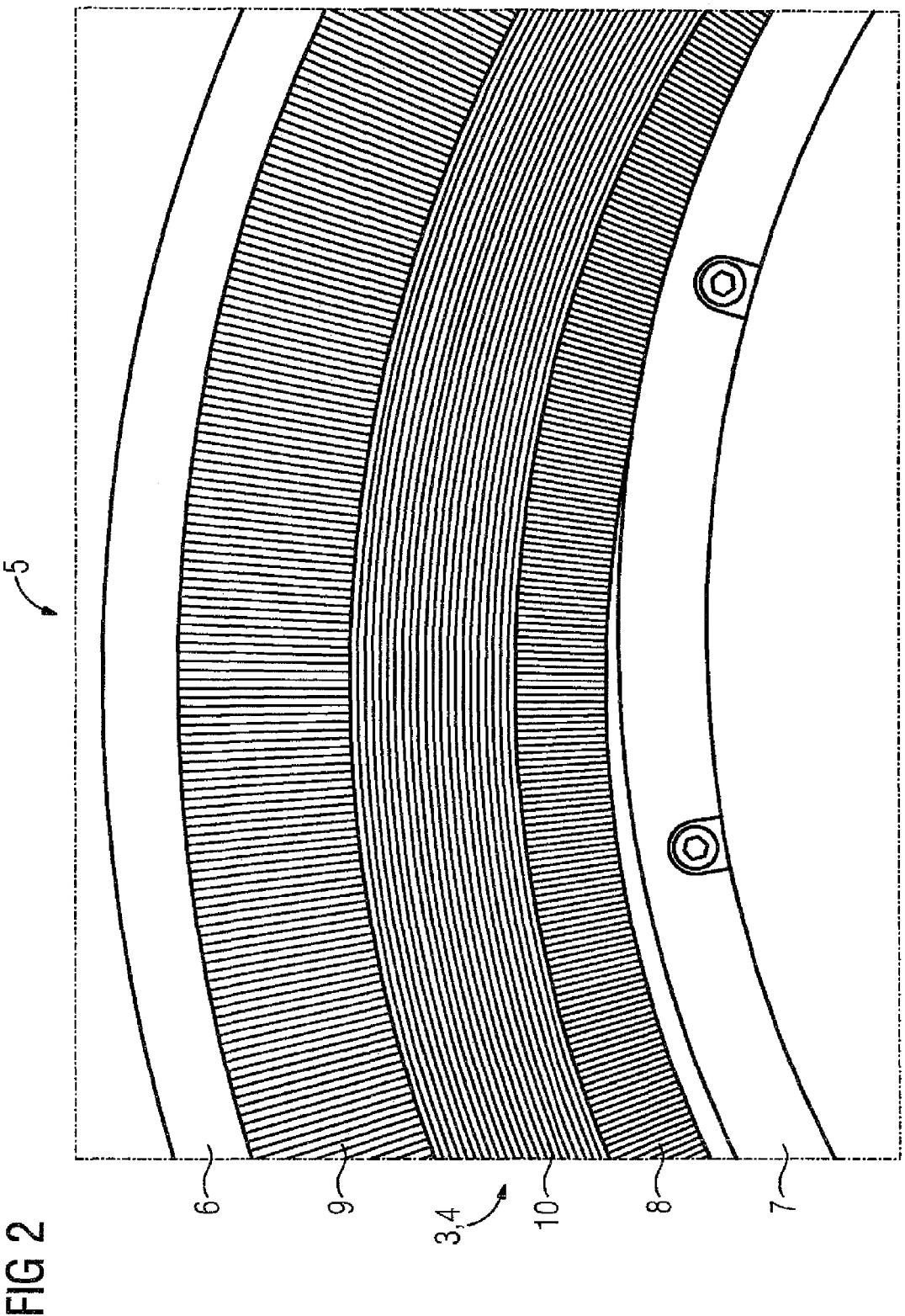
FIG. 2 shows a top view of a section of an electromagnet from FIG. 1.

FIG. 2 shows a top view of a section of an electromagnet 3, 4 (axial bearing device). The electromagnet 3, 4 has an annular pot 5, only the concentric walls 6, 7 of which can be seen in FIG. 2.

The annular pot 5 is filled with a laminated innermost ring 8 and a laminated outermost ring 9. Between the two rings is situated a torroidal core 10. As will be explained in connection with FIG. 5, the innermost ring 8 together with the outermost ring 9 and a middle ring form an annular groove beneath the coil 10, into which the torroidal core 10 is inserted.

Figure 3:
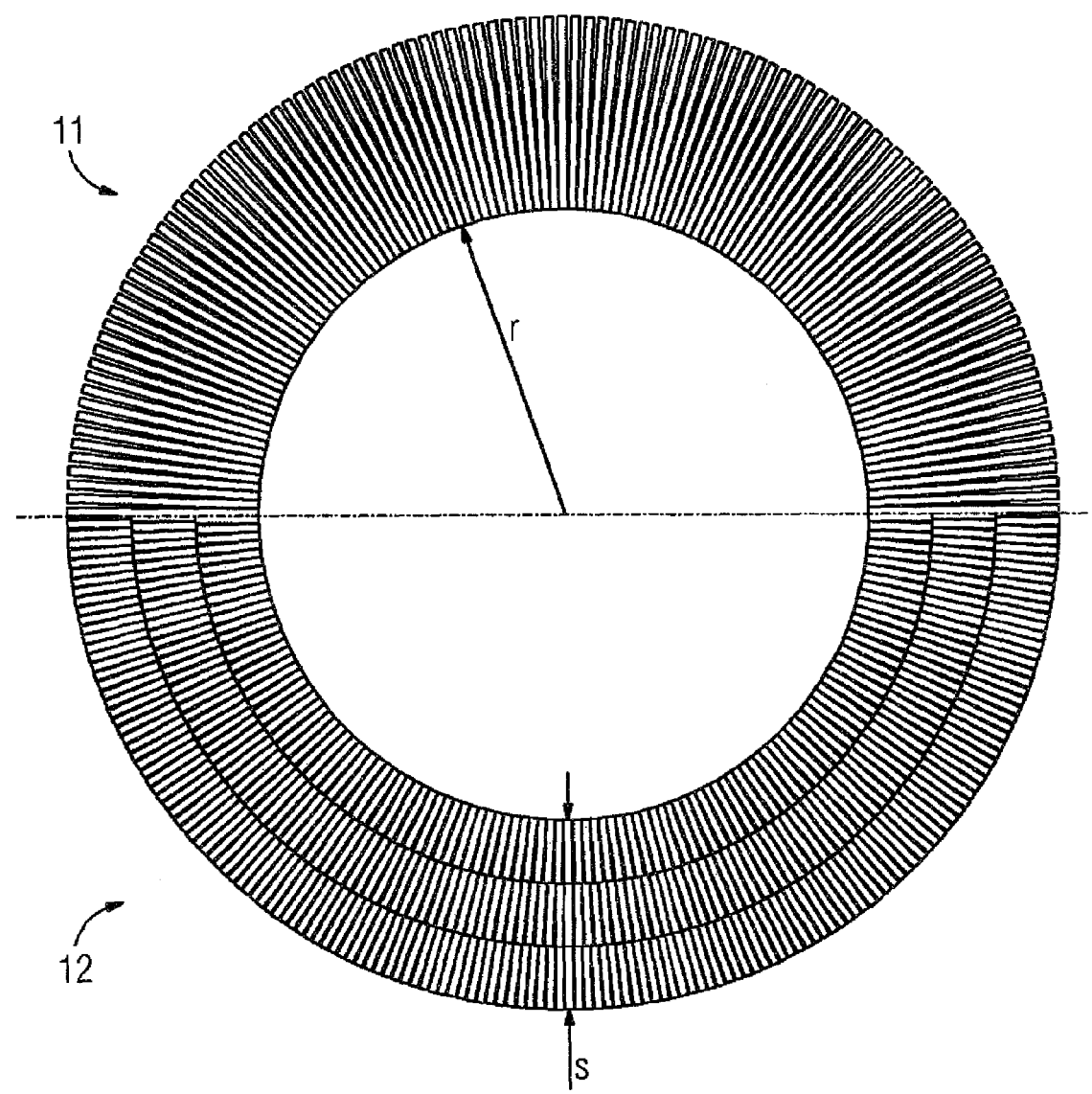
FIG. 3 shows a top view of an electrical sheet arrangement of an annular electromagnet.

The special, inventive nature of the lamination of the annular magnet can be seen from FIG. 3. A conventional lamination 11 can be recognized in the upper half of FIG. 3. The lower half of the laminated ring on the other hand exhibits the lamination according to the invention 12.

Figure 4:
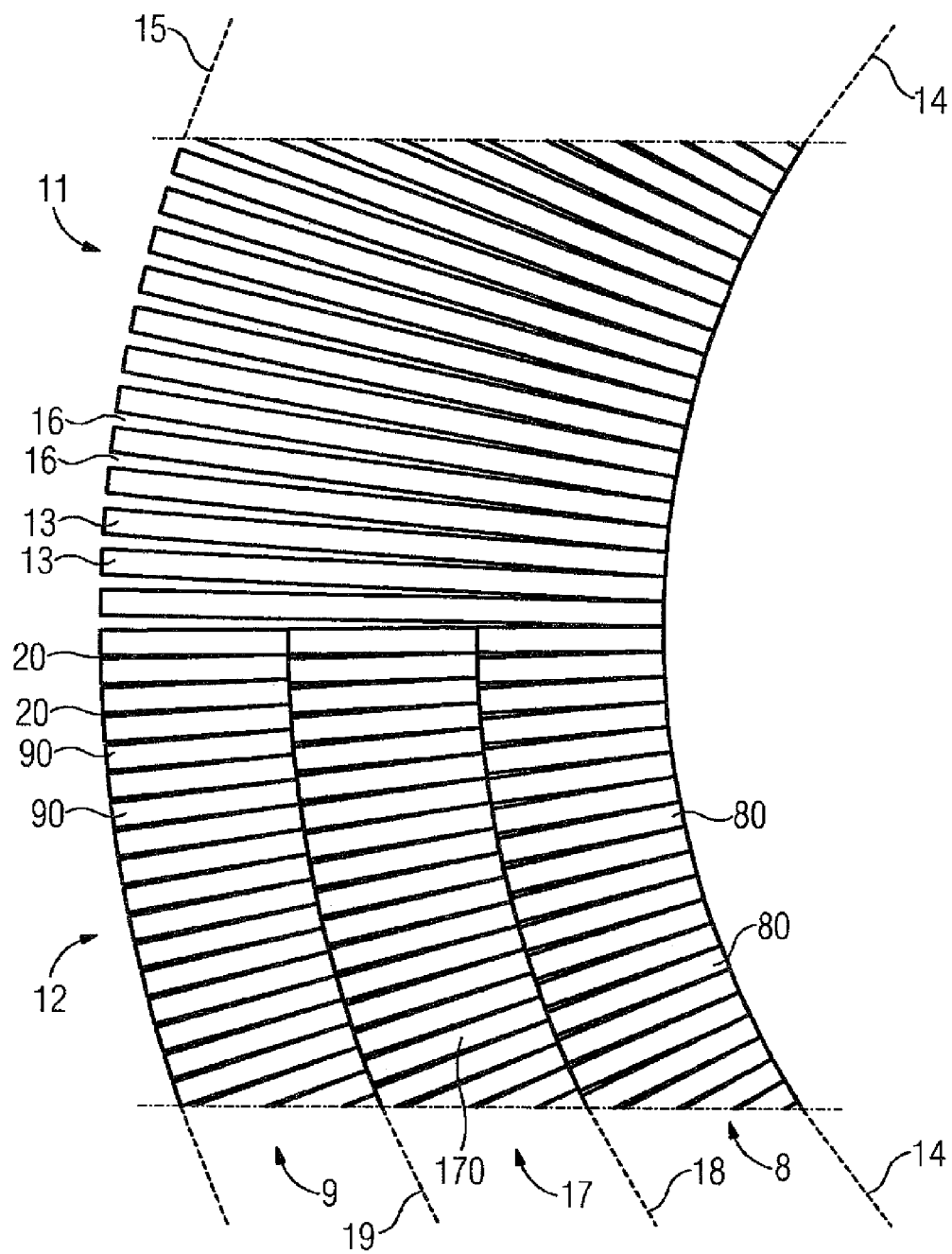
FIG. 4 shows an enlarged view of a section from FIG. 3.

FIG. 4 shows an enlarged section of the ring from FIG. 3. The differences between conventional lamination 11 and lamination according to the invention 12 can be better recognized there. Normal electrical sheets are used here for the laminations. They all have the same thickness.

With the conventional lamination 11 and also with the lamination according to the invention 12 the individual sheets protrude radially outward. A star-shaped electrical sheet arrangement thereby results in each case. For explanatory purposes the entire annular electrical sheet arrangement is illustrated with two different laminations 11 and 12. In practice, one electrical sheet arrangement will naturally only have one of said two laminations across the entire circumference.

With the conventional lamination 11, each individual sheet 13 protrudes in the radial direction from the inner circumference 14 as far as the outer circumference 15. Since the individual sheets 13 abut one another directly at the inner circumference 14, on account of the star-shaped construction a relatively large gap 16 results in each case at the outer circumference 15 between adjacent sheets 13. The iron filling of a ring laminated in suchlike manner is correspondingly low.

With the lamination according to the invention 12, at least two concentric electrical sheet rings, in the present example three electrical sheet rings, are provided, namely the innermost electrical sheet ring 8, the outermost electrical sheet ring 9 and the electrical sheet ring 17 situated therebetween. In the schematic FIG. 3 and FIG. 4 the individual electrical sheet rings 8, 9 and 17 each have the same radial thickness. As can already be seen from FIG. 2 however, the radial thicknesses of the individual rings can be different. In particular they can, as is likewise explained in connection with FIG. 5, also protrude radially into one another.

The lower half of FIG. 4 illustrates that the individual sheets 80, 90 and 170 are radially shorter than the sheets 13 of the conventional lamination 11. The sheets 80 of the innermost electrical sheet ring 8 are also not formed in one piece with the sheets 90 and 170 of the outermost electrical sheet ring 9 and the middle electrical sheet ring 17. The sheets 90 are likewise not formed in one piece with the sheets 170. This then has the advantage that the individual sheets 80, 90 and 170 can abut one another at the respective inner circumference or inner radius 14, 18, 19 in the case of each of the electrical sheet rings 8, 9 and 17. This means that the iron filling at the inner circumferences 14, 18, 19 is 100% in each case and it reduces slightly towards the respective outer circumference of the corresponding electrical sheet ring 8, 9, 17. Since the individual sheets 80, 90, 170 do not however extend from the inner circumference 14 of the innermost electrical sheet ring 8 as far as the outer circumference 15 of the outermost electrical sheet ring 9 the gap 20 between for example adjacent sheets 90 in the circumferential direction is significantly smaller than a respective gap 16 in the case of conventional lamination 11. The reason for this is the fact that the outermost electrical sheet ring 9 has considerably more sheets 90 than the middle electrical sheet ring 17. The latter in turn has significantly more sheets 170 then the innermost electrical sheet ring 8. The innermost electrical sheet ring 8 has equally as many sheets 80 as the electrical sheet arrangement having conventional lamination 11.

With the three concentric electrical sheet rings 8, 9 and 17 a significantly higher iron filling can be achieved than in the case of conventional lamination 11. The axial force attained is proportional to the iron filling. The increase in force is determined from the ratio of the iron fillings. For an electrical sheet arrangement having a single ring, an iron filling f1 results. In the case of an electrical sheet arrangement having three concentric electrical sheet rings of the same radial thickness, an iron filling f3 results. The corresponding ratio of the iron fillings is then: $f3/f1 = 1 + s/(3\ r_i)$ where s corresponds to the radial thickness and $r_i$ to the inner radius of the electrical sheet arrangement. Increases in force of 10% to 20% thereby result with regard to typical construction sizes of electromagnets or axial bearing devices.

Figure 5:
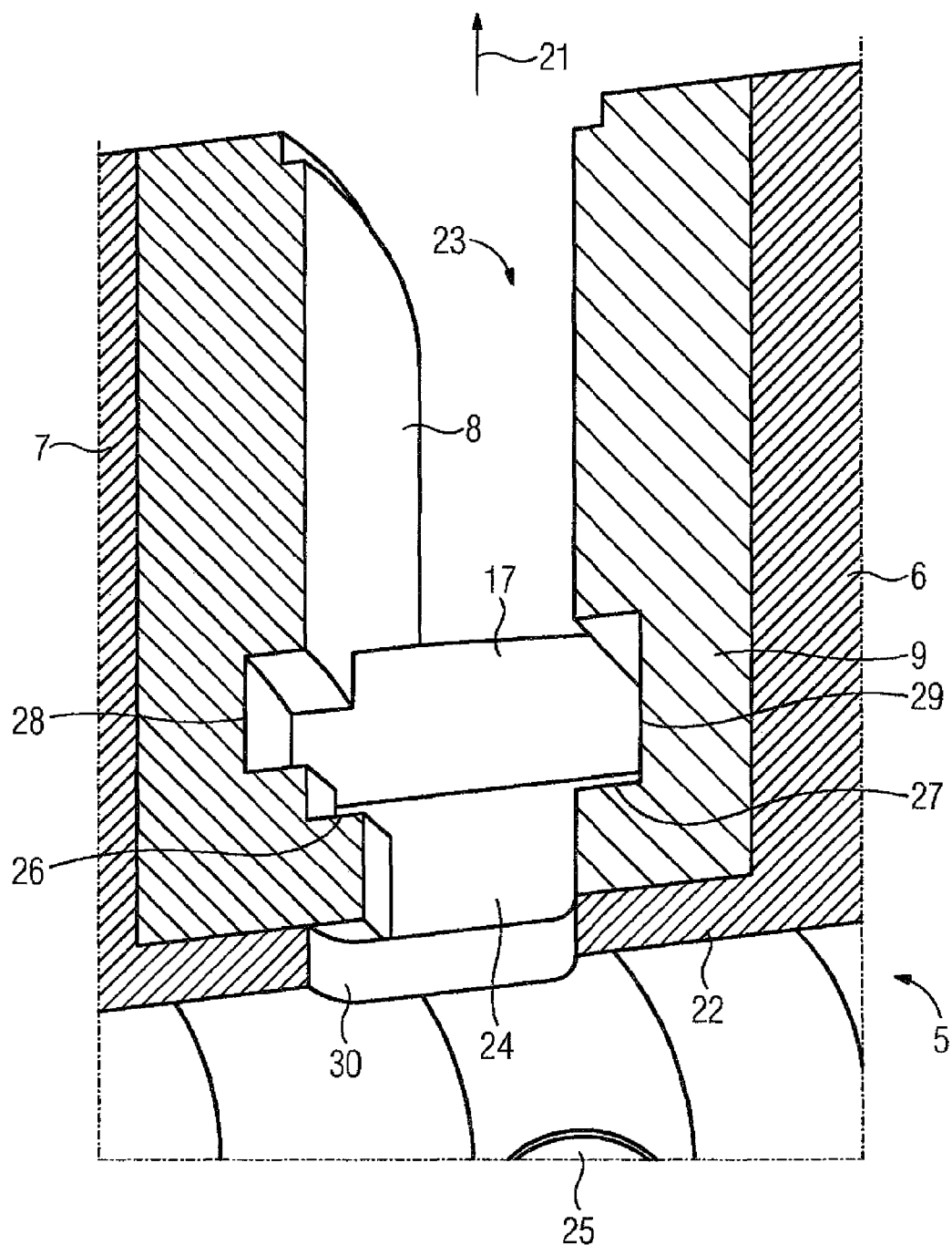
FIG. 5 shows a cross-sectional view through the electromagnet from FIG. 2 without a coil.

FIG. 5 illustrates a section of the cross-section through an axial bearing device according to the invention. In particular, the pot 5 with its U-shaped cross-section, its outer wall 6 and its inner wall 7 can be clearly recognized. The laminated innermost ring 8 nestles against the inner wall 7. The outermost laminated ring 9 abuts on the outer wall 6. The middle electrical sheet ring 17 is situated between the two electrical sheet rings 8 and 9. The lamination of the individual rings 8, 9, 17 cannot be seen in FIG. 5.

The two electrical sheet rings 8, 9 extend in the axial direction 21 from the base 22 of the annular pot 5 up to the top edges of the walls 6, 7. The middle electrical sheet ring 17 on the other hand extends significantly less far in the axial direction 21. This means that a groove 23 (which is however not included in the drawing in FIG. 5) for the torroidal core 10 is produced axially above the middle electrical sheet ring 17 and between the outermost electrical sheet ring 9 and the innermost electrical sheet ring 8.

Located axially below the middle electrical sheet ring 17 here is a retaining ring 24 which has a T-shaped cross-section and is attached by means of screws 25 on the base 22 of the annular pot 5. The radially protruding arms of the retaining ring 24 with its T-shaped cross-section grip above shoulders 26 and 27 of the innermost electrical sheet ring 8 and the outermost electrical sheet ring 9. The two electrical sheet rings 8, 9 are thereby fixed in the pot 5.

The two electrical sheet rings 8, 9 furthermore have grooves 28, 29 running in the circumferential direction, into which projections of the middle electrical sheet ring 17 protrude. The middle electrical sheet ring 17 is thereby retained in form-locked fashion (in relation to the axial direction 21) between the innermost electrical sheet ring 8 and the outermost electrical sheet ring 9. The three electrical sheet rings 8, 9 and 17 can thus be retained in the pot 5 by means of a single retaining ring 24. In principle, however, it is also possible to provide a plurality of retaining rings for attaching the electrical sheet rings.

Even if the above examples are embodied with three concentric electrical sheet rings, the electrical sheet arrangement can also consist of only two concentric electrical sheet rings or also of four and more electrical sheet rings. In the case of two electrical sheet rings, one half of the middle electrical sheet ring illustrated in FIG. 5 would then for example be connected in one piece with the outermost electrical sheet ring and the other half in one piece with the innermost electrical sheet ring.

The torroidal core 10 requires cable feeds. To this end, appropriate openings or cable outlets can be provided in the axial direction in the electrical sheet arrangement and also the pot 5. In the example shown in FIG. 5 the pot 5 has an opening 30 for this purpose in its base 22. Since the electrical sheet arrangement has three electrical sheet rings in this case, the middle electrical sheet ring 17 can be simply interrupted at the point corresponding axially with the opening 30. The retaining ring 24 would likewise need to be interrupted here, which can also be seen in FIG. 5. The innermost and outermost electrical sheet rings 8, 9 remain closed however. With regard to one-piece lamination, further disadvantages result here compared with multi-part lamination because the lamination needs to be interrupted at the cable outlet, which means that the respective sheets are no longer able to protrude outward. Otherwise, a substantial amount of extra work is required in order to create an opening for the connecting lines.

In order to increase the mechanical strength, the interstices between the sheets of the electrical sheet rings can be filled with resin.

In an advantageous manner the axial bearing device according to the invention, acting as a support, has an increased iron filling compared with known devices, which results in a correspondingly higher force density. The concentric arrangement having a plurality of rings moreover results in a robust construction which can be manufactured cost-effectively.

The invention claimed is:

1. A magnetic axial bearing device, comprising:
 an annular electrical sheet arrangement having individual sheets which protrude radially outward, with adjacent sheets forming a gap in a circumferential direction, said electrical sheet arrangement having at least two concentric electrical sheet rings, with essentially all the adjacent sheets of each electrical sheet ring meeting at the inner circumference of the electrical sheet ring; and
 an electrical coil inserted into the electrical sheet arrangement for producing a magnetic field in the electrical sheet arrangement,
 wherein the electrical sheet arrangement has at least three concentric electrical sheet rings, with an outer one, an inner one, and at least one middle one, wherein the at least one middle one of the electrical sheet rings having a depression for insertion of the electrical coil, wherein the depression runs through at least one of the inner sheet ring or the at least one middle sheet ring.

2. The magnetic axial bearing device of claim 1, wherein the middle one of the electrical sheet rings has an opening in an axial direction for feeding through cables for the electrical coil.

3. The magnetic axial bearing device of claim 1, further comprising an annular pot accommodating the electrical sheet arrangement.

4. The magnetic axial bearing device of claim 3, further comprising at least one retaining ring for retaining the electrical sheet arrangement in the pot.

5. The magnetic axial bearing device of claim 4, wherein the electrical sheet arrangement has three concentric electrical sheet rings, said at least one retaining ring having a T-shaped cross-section and being configured to retain an innermost and an outermost one of the electrical sheet rings in an axial direction in form-locked fashion in the pot.

6. The magnetic axial bearing device of claim 5, wherein a middle one of the electrical sheet rings is retained in form-locked fashion in the pot by the innermost and outermost electrical sheet rings.

7. The magnetic axial bearing device of claim 1, further comprising a resin to fill interstices between the sheets of the electrical sheet arrangement.

8. An electrical machine, comprising a magnetic axial bearing device including an annular electrical sheet arrangement having individual sheets which protrude radially outward, with adjacent sheets forming a gap in a circumferential direction, said electrical sheet arrangement having at least two concentric electrical sheet rings, with essentially all the adjacent sheets of each electrical sheet ring meeting at the inner circumference of the electrical sheet ring, and an electrical coil inserted into the electrical sheet arrangement for producing a magnetic field in the electrical sheet arrangement, wherein the electrical sheet arrangement has at least three concentric electrical sheet rings, with an outer one, an inner one, and at least one middle one, wherein the at least one middle one of the electrical sheet rings having a depression for insertion of the electrical coil, wherein the depression runs through at least one of the inner sheet ring or the at least one middle sheet ring.

9. The electric machine of claim 8, wherein the middle one of the electrical sheet rings has an opening in an axial direction for feeding through cables for the electrical coil.

10. The electric machine of claim 8, wherein the magnetic axial bearing device has an annular pot accommodating the electrical sheet arrangement.

11. The electric machine of claim 10, wherein the magnetic axial bearing device has at least one retaining ring for retaining the electrical sheet arrangement in the pot.

12. The electric machine of claim 11, wherein the electrical sheet arrangement has three concentric electrical sheet rings, said at least one retaining ring having a T-shaped cross-section and being configured to retain an innermost and an outermost one of the electrical sheet rings in an axial direction in form-locked fashion in the pot.

13. The electric machine of claim 12, wherein a middle one of the electrical sheet rings is retained in form-locked fashion in the pot by the innermost and outermost electrical sheet rings.

14. The electric machine of claim 8, wherein the magnetic axial bearing device has a resin to fill interstices between the sheets of the electrical sheet arrangement.

\* \* \* \* \*